Sept. 20, 1971 SOJI NAKAMOTO 3,606,205

VIDEO-TAPE RECORDER WITH A STILL REPRODUCTION DEVICE

Filed Sept. 12, 1969

3 Sheets-Sheet 1

INVENTOR.
SOJI NAKAMOTO

Sept. 20, 1971 SOJI NAKAMOTO 3,606,205

VIDEO-TAPE RECORDER WITH A STILL REPRODUCTION DEVICE

Filed Sept. 12, 1969 3 Sheets-Sheet 2

INVENTOR.
SOJI NAKAMOTO

By Darby & Darby

VIDEO-TAPE RECORDER WITH A STILL REPRODUCTION DEVICE

Filed Sept. 12, 1969

3 Sheets-Sheet 3

INVENTOR.
SOJI NAKAMOTO

United States Patent Office 3,606,205

Patented Sept. 20, 1971

3,606,205

VIDEO-TAPE RECORDER WITH A STILL REPRODUCTION DEVICE

Soji Nakamoto, Osaka Prefecture, Japan, assignor to Sanyo Electric Co., Ltd., Moriguchi-shi, Japan Filed Sept. 12, 1969, Ser. No. 857,358
Claims priority, application Japan, Sept. 14, 1968, 43/66,280, 43/79,614
Int. Cl. B11b *15/32;* G03b *1/04*
U.S. Cl. 242—206 13 Claims

ABSTRACT OF THE DISCLOSURE

A video-tape recorder with still motion reproduction device which is able to adjust finely the scanning position of the tape on the rotary head and/or to change the picture frame of the tape one by one by rotating the capstan together with the tape keeping suitable tension for reproducing easily a desirable still picture without beat-noise.

RELATED APPLICATIONS

Application Ser. No. 857,504, in the name of Fujiaki Narita, filed concurrently herewith entitled "Video Tape Recorder With Slow Motion Reproducing Apparatus" and application Ser. No. 857,323, in the name of Fujiaki Narita, filed concurrently herewith and entitled "Servo Control System For Video Tape Recorder With Slow Motion Reproducing Capability" now Pat. No. 3,573,361, both of which are assigned to the same assignee.

This invention relates to video-tape recorders, and more particularly to a video-tape recorder equipped with a still reproduction device.

A video-tape recorder employing a rotary magnetic head system which is recording and reproducing as the head system scans in the diagonal direction of a magnetic tape transported along the rotary head system is known. Such recorders reproduce a still or slow-motion picture either by stopping the tape to trace repeatedly the head on the same recording track or by transporting the tape at the speed of about ⅕ to ⅙ times that of recording to scan the head several times on the same recording track. During still and slow-motion reproduction of such a video-tape recorder, the relative scanning angle between the rotary magnetic head and the recording track of the tape which is either stopped or transporting at a sharply reduced speed from that of recording, differs considerably from that of the regular speed reproduction in which the tape is transported at the same speed of recording. To change the course of the scanning, it is necessary to move the tape up or down to adjust its relative scanning position with respect to the rotary magnetic head for reproducing a good picture.

Prior to the present invention, for example, a video-tape recorder has been made in which the scanning position of the tape with respect to the head system for still reproduction was adjusted by changing the winding condition on the tape reels with braking by the operator's hand. Such a prior art video-tape recorder is not only remarkably unstable in reproducing of a still picture but also has no capability to automatically adjust for giving the right position and tension of the tape.

In video-tape recorders of the type referred to above, it is also required that the speed for transporting the magnetic tape be able to be slowed down from a higher recording speed (e.g. of 19.5 centimeters per second) either to a slow-motion reproducing speed (e.g. of 3.25 centimeters per second) or to complete rest for still reproducing. In a conventional video-tape recorder which is capable of separating the drive capstan and pinch roller from the magnetic tape, it is possible to change the transporting speed of the tape from 19.5 centimeters per second to rest for the still reproduction as well as to stop instantly. However, when the capstan is abruptly separated from the pinch roller, there arises the possibility of damaging the recorder itself or cutting the tape as a result of unexpected strain or looseness of the tape due to unbalanced braking and inertia of the changing mechanism by changing rapidly the transporting speed of the tape from the normal recording reproducing speed to rest for the still reproducing.

This invention has for its object the provision of a video-tape recorder which overcomes the above-mentioned drawbacks and disadvantages in conventional recorders of a similar nature.

It is an object of the invention to provide a video tape recorder which is so constructed that a tape at rest for still motion reproduction is held between the capstan and pinch roller disconnected from the drive means of recording but it is still possible to adjust finely the tape scanning position and/or to change its frame of video picture one by one with respect to the rotary magnetic head by rotating the capstan with an adjusting means for reproducing easily a desirable still picture.

It is another object of the invention to provide a video tape recorder which is so constructed that during still motion reproduction not only is the capstan detached from the transmission of the drive means while holding the tape between the capstan and the pinch roller but also the capstan is brought into contact with an adjusting means for adjusting and/or changing the tape position on the head in a very easy manner.

It is a further object of the invention to provide a video tape recorder which is so constructed that a tape at rest on the guide cylinder of the head between the take up reel and the supply reel is always kept under suitable tension without looseness or strain for preventing unexpected damage of the tape.

It is still a further object of the invention to provide a video-tape recorder which is so constructed that the relative scanning angle between the rotary head and the recording track of the tape in the still reproduction operating mode is able to adjust to compensate for tracking error of the tape with respect to the head by shifting the path of the tape around the guide cylinder of the head for reproducing a good quality picture without beat-noise.

It is still another object of the invention to provide a video-tape recorder having a change-over mechanism for changing from slow motion reproduction mode to the still reproduction mode and vice-versa, and a neutral mechanism for putting the change-over mechanism when in the still reproduction mode back in the neutral position ready for operating in the regular reproduction mode when required.

It is yet a further object of the invention to provide a video-tape recorder which is adapted to be conveniently made in various sizes, which is simple, compact and lightweight in design, which is durable in construction, which is reasonable in manufacturing cost, and which is capable of performing its inteded functions in an entirely satisfactory and trouble-free manner.

These and other objects and aspects of the invention will be more clearly understood from the following description of an embodiment of the invention shown, by way of example only, in the accompanying drawings in which.

Figure 1:
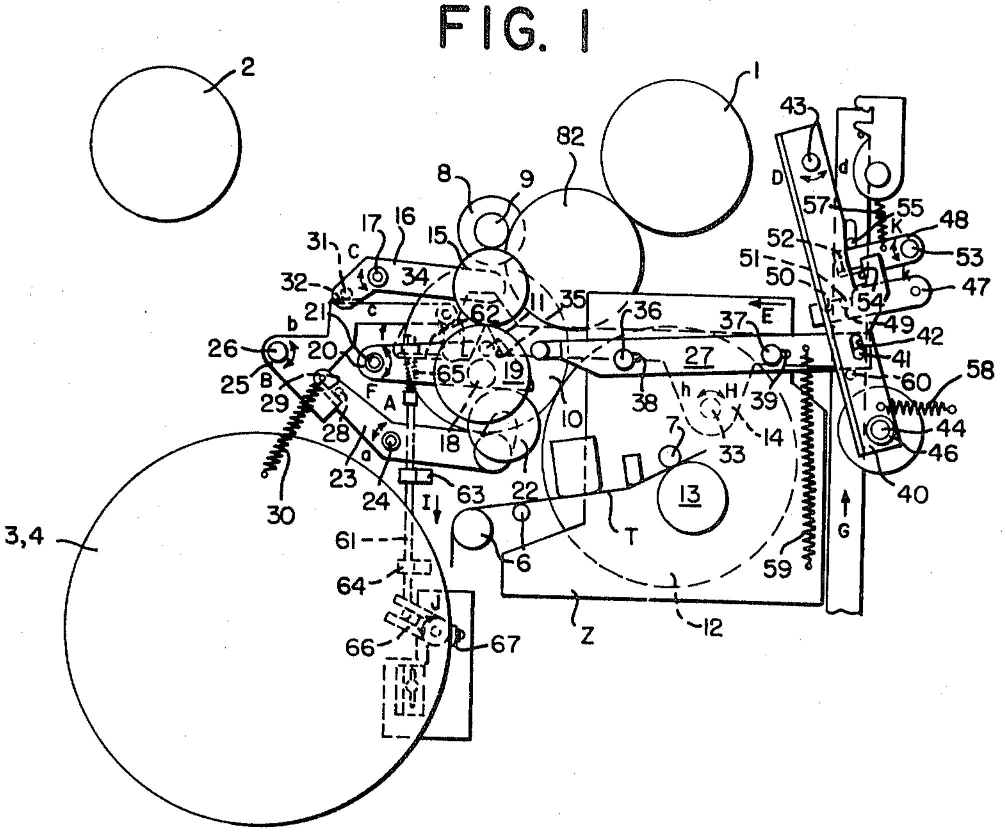
FIG. 1 shows schematically a top plan view, showing a part of a mechanism in the normal speed reproduction mode, of an embodiment of a video-tape recorder with a still reproduction device according to the invention.

A video-tape recorder of this invention comprises, as shown in FIGS. 1 to 4, a means for holding a tape T between a take up reel 1 and a supply reel 2. The tape T passes over a guide cylinder 3, 4, having a rotating head 5 therein and between tape guides 6 and a capstan 7. The head 5 is representative of any number of rotating heads which are driven at a constant speed. A drive transmission, described below, is provided for driving the capstan to transport the tape. The recorder is capable of operation during a still motion reproduction mode. The still motion reproduction apparatus, which constitutes a major part of the invention, includes a means for keeping the tension of the tape, a means for shifting the path of the tape with respect to the guide cylinder, a means for detaching the capstan from the transmission of the drive means and a means for fine adjusting of the position of tape with respect to the head.

The drive means basically comprises a regular reproducing mechanism which rotates the capstan 7 to transport the tape at the same speed as that of the recording for reproducing the picture at normal speed, a slow-motion mechanism which rotates the capstan at a one nth slowed down speed of recording such as one-fifth or one-sixth of the speed of recording for reproducing the slow-motion picture, and a still mechanism. The still motion mechanism includes detaching and adjusting means capable of stopping the capstan to hold the tape at one position with respect to the guide cylinder and heads for reproducing the still picture.

The regular reproducing mechanism comprises a large diameter drive pulley 8 coaxially mounted on the shaft of a motor (not shown in figures) together with a smaller diameter drive pulley 9, a main idler 10 rotatably pivoted on the shaft 11 of a lever (not shown in figures) which is in turn pivoted on a chassis (not shown in figures) and a fly-wheel 12 coaxially mounted on the capstan 7 which holds the tape against a pinch roller 13. The main idler 10 contacts both the larger diameter drive pulley 8 and the fly-wheel 12 for conveying the rotation of the motor in normal speed reproduction to the capstan 7. Operation of a main lever 14 during slow-motion reproduction, as described below, separates the main idler 10 from both the fly-wheel 12 and drive pulley 8.

The slow-motion speed mechanism includes the smaller diameter drive pulley 9 which engages (FIG. 2) a first idler 15 rotatably mounted on one end of an L-shaped first lever 16 which is pivoted on the chassis at the center 17. A pair of smaller and larger diameter second idlers 18, 19 are coaxially mounted for rotation on one end of a second lever 20 which is pivoted on the chassis at its other end 21. A third idler 22 is rotatably mounted on one end of a U-shaped third lever 23 which is pivotally mounted to the chassis near its center 24.

Figure 2:
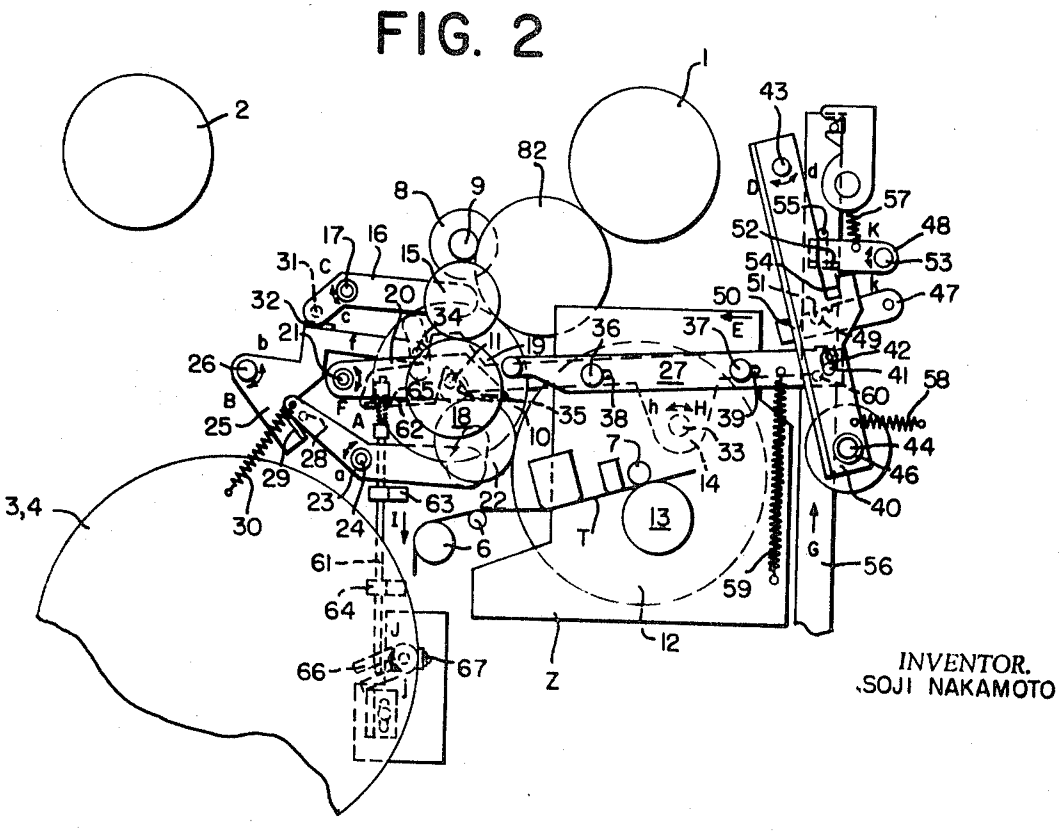
FIG. 2 is a plan view which shows the mechanism of FIG. 1 in the slow motion reproduction mode.

As shown in FIG. 2, in the slow-motion reproduction mode the rotation of the motor is conveyed from the small diameter drive pulley 9 through the first idler 15 and the larger diameter second idler 19. The larger diameter second idler 19 rotates the coaxial smaller diameter idler 18 which in turn drives the third idler 22 which engages and rotates the fly-wheel 12 of the capstan 7.

The first and third levers 16, 23 are engaged with an L-shaped fourth lever 25 which is pivotally mounted on the chassis at the point 26. The second lever 20 may be engaged with a release lever 27 at the slanting portion of the end thereof as described below. At the other end of the third lever 23 remote from idler 22 is provided a third pin 28 engaged with an upstanding bent piece 29 which is formed at the pivoted end of the fourth lever 25 and a spring 30 connected between the end of the third lever 23 and on the chassis to pull the third lever in the counterclockwise direction of the arrow A as shown in FIGS. 1 to 4. The other ends of the first and fourth levers 16, 25 engage each other by a first pin 31 on lever 16 and an upstanding bent tab portion 32 near the center of lever 25. Pin 31 is above tab 32 as seen in the figures while pin 28 is also above tab 29, so that both levers 16, 25 are pulled by the spring 30 through the third lever 23 respectively in the counter-clockwise and clock-wise directions of the arrows C and B, respectively, as shown in FIGS. 1 to 4.

In normal speed reproduction (FIG. 1) the main lever 14, which has an extending portion rotatably pivoted on a frame Z at the center 33, is engaged with a fourth pin 34 provided on the right end of the fourth lever 25 to rotate lever 25 in the counter-clockwise direction of the arrow *b* against the spring 30, whereby the first and third levers 16, 23 are rotated by the two upstanding tabs 32 and 29 on the fourth lever 25 to the clockwise direction of the arrows C and A to space the first and third idlers 15 and 22 apart from the small diameter drive pulley 9 and the fly-wheel 12, respectively. In slow-motion reproduction (FIG. 2) the main lever 14 is engaged at its recess 35 with the shaft 11 of the main idler 10 to put the main idler apart from the large diameter drive pulley 9 and the fly-wheel 12.

Figure 3:
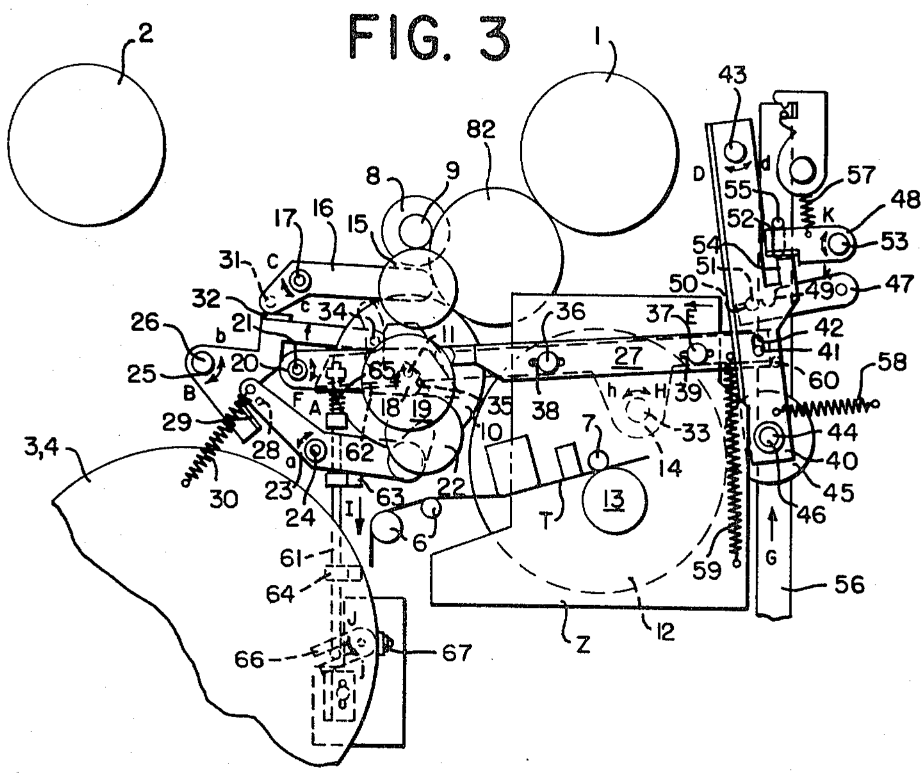
FIG. 3 is a plan view which shows the mechanism of FIG. 1 in the still motion reproduction mode.

The arrangement for detaching the capstan 7 from the drive transmission (FIGS. 3 and 4) comprises the release lever 27 which is mounted on the frame so as to move slidably by loosely fitting sliding pins 36, 37 thereon which fit into guide holes 38, 39 of the frame Z. In the still reproduction mode (FIG. 3) the end of the release lever 27 is able to engage with the slanting portion of the second lever 20 to rotate the second lever to the clockwise direction of the arrow F as shown in FIG. 3. This engages the third idler 22 with the small diameter second idler 18 of the second lever 20 and rotates it to the same clockwise direction with the third lever to move the third idler 22 apart from the fly-wheel.

The drive detaching means also includes adjusting means, locking means and operating means, and two or more of these means may be united as one means, if necessary, such as a detaching and adjusting means comprising a rotary mechanism rotatable to detach the capstan 7 from the transmission of the drive means and to adjust the tape position on the head simultaneously. The latter arrangement includes one end of the release lever 27 being engaged with a rotary lever 40 by fitting a fixed pin 41 on the release lever into a sliding hole 42 of the rotary lever. The rotary lever 40 constituting the adjusting means is pivoted at one end 43 on the chassis and has provided on its other end a rotary shaft 44 holding a fourth idler 45 and a rotary knob 46.

One end of a cam plate 47 and a lockplate 48 constituting the locking means is engaged with the center portion of the rotary lever 40 to fix and lock the fourth idler 45 in two positions. The cam plate 47 is fixed on the chassis and has two notches or recesses 49, 50 for engaging a pin 51 on the rotary lever to fix the fourth idler 45 in the two positions. In the first position (shown in FIGS. 1, 2 and 4) the pin 51 is in notch 49 and the fourth idler 45 is spaced from the fly-wheel 12. In the second position (shown in FIG. 3) the pin 51 is in notch 50 and the fourth idler 45 is engaged with the fly-wheel. The lock plate 48 is rotatably pivoted on the chassis at the end 53 and has on its other end an upstanding tab 52 to engage with a U-shaped hook 54 of the rotary lever 40 to lock the rotary lever in the first position of the cam plate. The lock plate 48 is also engaged with a pin 55 provided on a sliding plate 56 of the mechanism's operating means. The lock plate 48 is pulled by a spring 57 in the clockwise direction of the arrow K to lock the rotary lever 40 when the sliding plate 56 is in the first position (down) for regular speed reproduction (FIG. 1) and to unlock the rotary lever 40 when the sliding plate is in the second position (up) for slow-motion reproduction (FIG. 2). Two springs 58, 59 are provided on the respective right ends of the rotary lever 40 and main lever 14 to pull them to the counter-clockwise and clockwise directions of the arrows *d* and H, respectively, as shown in FIGS. 1 to 4.

The mechanism operating means includes the sliding plate 56 which is engaged with the main lever 14 and the lock plate 48 by the pins 60, 55 respectively on plate 56. Also included is a change-over mechanism capable of shifting the sliding plate 56 for the three operating modes, that is, regular speed reproduction, slow-motion reproduction and still production. A neutral mechanism is also provided to put the change-over mechanism in the neutral position. The change-over mechanism and neutral mechanism may be a push button arrangement as described below.

Figure 6:
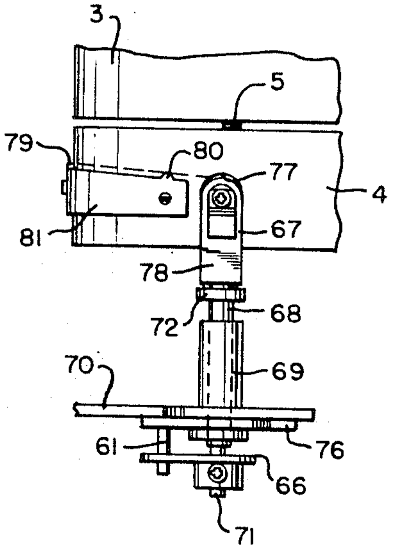
FIG. 6 is a side view showing another part of the mechanism of FIG. 1.
Figure 7:
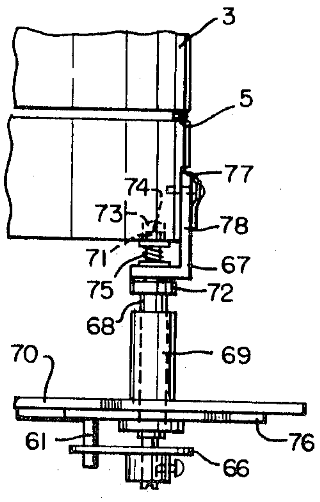
FIG. 7 is a front view of FIG. 6.

The shifting means comprises the main lever 14 engaged with the sliding plate 56 by the pin 60 on the plate to rotate the main lever at 33 and move a connecting rod 61 engaged with a downwardly bent end 62 of the main lever 14 to slide the connecting rod 61 and its connected spring 65 in the straight direction of the arrow I through guide plates 63, 64. The other end of connecting rod 61 remote from main lever 14 has a bent end which fits within a U-shaped rotary plate 66 to rotate plate 66 to the counter-clockwise direction of the arrow *j* as shown in FIGS. 2 and 3 when the rod 61 is moved down. A tape guide holder 67 (see FIGS. 6 and 7) is provided on the periphery of the guide cylinder 3, 4 to hold on its upper edge the bottom of the tape being transported. A mechanism responsive to the rotation of the rotary plate 40 between its two positions vertically moves the tape guide holder 67 within a range of about 0.1 millimeter. The tape guide holder 67 changes its position in accordance with the position of the sliding plate 56 through the main lever 14, the connecting rod 61, the rotary plate 40 and guide holder moving mechanism, to be described below.

The tape guide holder moving mechanism (FIGS. 6 and 7) comprises a threaded bolt 68 fixed at its lower end on the rotary plate 66. Bolt 68 has a thread pitch of about 0.6 millimeter and is screwed into a guide nut 69 on the chassis 70. A sliding shaft 71 is connected to the tape guide holder 67. This shaft has a cap on its lower end 72 on the top of the threaded bolt 68 and its upper end 74 is slidably inserted into a recess hole 73 on the bottom of the guide cylinder 3, 4. A spring 75 is provided between the lower end of sliding shaft 71 and the bottom of guide cylinder 3, 4 to hold the sliding shaft 71 on the bolt 68 and a second guide nut fitting 76 is arranged on the bottom of threaded guide nut 69 to adjust the fixed position of the guide nut with respect to the chassis 70.

The tape guide holder 67 moves vertically with the sliding shaft 71 by rotating the screw bolt 68 together with the rotary plate 66 to shift the path of the tape around the guide cylinder. The guide cylinder comprises a lower stationary cylinder 3 and an upper stationary cylinder 4 and the rotary head 5 is mounted for rotation between them. The drive for the head 5 is not shown. On the surface of the lower cylinder 4 a notched guide 77 is provided for an elongated piece 78 of the tape guide holder to travel in. A tape guide band 81 of curved shape having spaced supporting points 78, 90 is mounted near the bottom of the guide cylinder 4. The tape guide holder 67 is located adjacent the trailing end of the guide band 81 to engage at the top 77 of piece 78 the tape leaving the guide cylinder. The tape (not shown) during normal speed operation travels over the dotted extension line connecting the support points 79, 80 at the top 77 of piece 78. The shifting of the guide 67 compensates for the relative scanning angle between the head and the recording track of the tape when the recorder is in slow motion or still motion reproduction.

The means for keeping the tension on the tape during still motion reproduction comprises a fifth idler 82 provided between the smaller diameter drive pulley 9 of the motor and a driving pulley on the take up reel drive 1. In all three modes of normal speed, slow motion speed and still motion (FIGS. 1–3), the fifth idler 82 drives against the take up reel 1 to act as a frictional transmission means to keep the tension of the tape applied between the take up reel and the supply reel. Conventional braking means provided between the take up reel and the supply reel also may be used as additional tension keeping means, if necessary.

For the purpose of describing the operating of the illustrated embodiment of the invention, it is assumed that each element of the above mechanism is in the relative positions as shown in FIGS. 1 to 4.

In the normal speed recording or reproduction, as shown in FIG. 1, the change over mechanism and the sliding plate 56 are in the first position (down) of the regular reproduction so that the rotary lever 40 is locked at 54 by the locking plate 48 and tab 52 with the pin 51 in the first recess 49 of the cam plate 47. This spaces the fourth idler 46 away from the fly-wheel 12 of the capstan 7 and puts the release lever 27 away from the second lever 20 of the second idler 18, 19. The main lever 14 is rotated in the clockwise direction of the arrow H by the pin 41 of the sliding plate 56 so that the fourth lever 25 is rotated with the first and third levers 16 and 23 to put the first and third idlers 15 and 23 apart from the smaller diameter drive pulley 9 and fly-wheel 12, respectively, while the main idler 10 comes into contact with the larger diameter drive pulley 8 and fly-wheel 12 for driving the capstan 7 at the same speed as that of recording. Also at this time the connecting rod 61 is moved in the upward direction of the arrow *i* by pulling (clockwise motion) of the main lever 14, and the tape guide holder 67 is in the low position shown by the extension line connecting the support points 79, 80 to make the tape assume the same position as that of recording. Accordingly, the tape is transported at the same speed and in the same position as that of recording and the rotary head 5 has the same relative scanning angle with respect to the recorded track of the tape as that of recording to reproduce the normal speed motion picture.

In the slow-motion reproduction, as shown in FIG. 2, the change over mechanism and the sliding plate 56 are in the second position (up) of the slow-motion reproduction. When the sliding plate 56 is moved in the upward direction of the arrow G, as shown in FIG. 2, from the first position to the second position by the change over mechanism, the main lever 14 is rotated by the pin 41 of plate 56 in the counterclockwise direction *h* to engage with the shaft of the main idler 10 but becomes spaced from the fourth lever 25. The lock plate 48 is released from the pin 55 of the sliding plate 56 and is rotated in the clockwise direction of the arrow K by the lock plate spring 57 to unlock the rotary lever 40. The main idler 10 is spaced from the larger diameter drive pulley 8 and fly-wheel 12 by the main lever 14, while the first and third idlers 15 and 22 are engaged with the smaller diameter drive pulley 9 and fly-wheel, respectively, by the spring 30 of the third lever 23. When the pin of the fourth lever 25 is released from the main lever 14, the spring 30 rotates the third lever 23 in the counterclockwise direction of the arrow *a* and the fourth, first and second levers 25, 16 and 20 to the clockwise direction of the arrows B, C and F, respectively, so that the smaller diameter drive pulley 9 of the motor is connected with the fly-wheel 12 of the capstan 7 through the first, second and third idlers 15, 18 and 22 to rotate the capstan 7 at $1/n$ slow down speed of recording. The number $n$ is an integer, preferably from 2 to 12. Also, the connecting rod 61 is moved in the downward direction of the arrow I by pushing (counterclockwise motion) of the main lever 14 by pin 60 and the tape guide holder 67 is moved up over the extension line which is the position of the tape during recording and normal speed reproducing. The threaded bolt 68 connected to the rotary plate 66 which is rotatable by the movement of the connecting rod 61 is elevated in accordance with the rotary angle of the plate and the thread pitch to move tape guide holder 67 up above the support points 79, 80 thereby transporting the tape on the high position of the tape guide holder and only on one fixed support point 79 without using the other support point 80 therebetween to compensate for tracking error of the tape against the head. Accordingly, the tape is transported at the slowed down speed and in the elevated position from that used during recording to compensate for the relative scanning angle between the recorded track of the tape and reproduction of the slow-motion picture. On the track of the tape are recorded standard control signals for normal speed reproduction and slow motion control signals for slow motion reproduction which are $n$ times the frequency of the standard control signals. The rotary head preferably comprises main and sub heads for reproducing the slow motion picture. This is described in the foregoing two applications.

As mentioned above, the lock plate 48 locks the rotary lever 40 in normal speed reproduction but unlocks it in the slow motion reproduction, so that the operation of changing to still reproduction can be made only from the condition of slow-motion reproduction. In changing the operation from slow-motion reproduction to still reproduction, the rotary lever 40 is operated by the rotary knob 46 to rotate it to the second recess 50 of the cam plate 47 against the spring 58. In still reproduction, as shown in FIG. 3, the change over mechanism and the sliding plate 56 are in the same position (up) as in slow-motion reproduction (FIG. 2). The main lever 14 is in the position of engaging with the shaft of the main idler 10 to space the main idler away from the fly-wheel 12 and push the connecting rod 61 downward to move the tape guide holder 67 to the elevated position. When the rotary lever 40 is operated to rotate and fix it to the second recess 50 of the cam plate 47 by the knob 46, the fourth idler 45 is engaged with the fly-wheel 12 to be able to rotate it by the rotary knob 46, and at the same instance the release lever 27 is engaged with the slanting portion of the second lever 20 and rotates the second and third idlers 18 and 22 to space the third idler 22 away from the fly-wheel 12. Therefore, the fly-wheel and capstan are stopped and the tape is held between the pinch roller 13 and the capstan with the fly-wheel engaged with the fourth idler 45 which is rotatable by the rotary knob 46. The tape is placed on the elevated position of the tape guide holder along the periphery of the guide cylinder. The main and sub heads scan the tape which has been raised to compensate for the relative scanning angle for the recorded track of the tape to reproduce the still picture. Sometimes the tape will come to rest with the guard band in a position to be scanned by the heads or inclined incorrectly with respect to the heads. This may create beat-noise in the reproduced still picture. In such occasions, the rotary knob 46 is operated to rotate it together with the fly-wheel 12 slightly. This finely moves the tape to adjust its position with respect to the head, whereby the relative scanning position between the recorded track of the tape and the head can be easily adjusted to reproduce a good still picture.

Moreover, in the still reproduction mode, the other mechanism, except for the link means connecting the release lever 27 with the rotary lever 40, is maintained in the same condition as in slow motion reproduction. The resting tape held between the capstan 7 and the pinch-roller 13 is held in constant tension by the driving of the take up reel 1 through the frictional transmission means of the fifth idler 82. Any excess tape freed by rotation of knob 46 is also taken up in this way. This arrangement provides for excellent reproduction of a still picture as well as a slow-motion picture.

When changing from the still reproduction back to the slow-motion reproduction, it is only necessary to operate the link means to return the cam plate 47 back to the first position of slow-motion reproduction by the movement of the rotary knob 46. Operation of the recorder for slow motion is as explained before.

Figure 4:
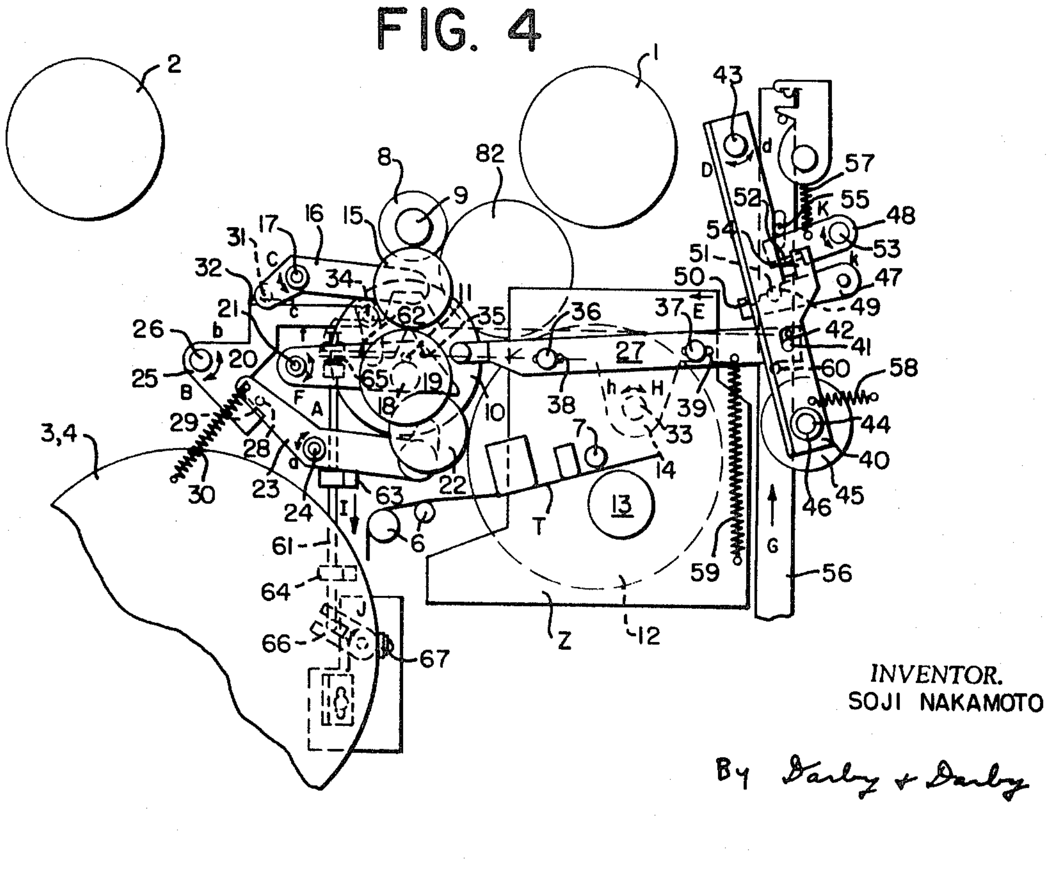
FIG. 4 is a plan view which shows the mechanism of FIG. 1 in the neutral position.

The changeover mechanism effective to give the condition of the still reproduction, as shown in FIG. 3, is put into the neutral position prior to shifting for operation at regular speed reproduction, as shown in FIG. 4, by the neutral mechanism. In the neutral position of the device the sliding plate 56 and the main lever 14 and link means are in the first position (plate 56 up) for regular speed reproduction. The main and fifth idlers 10 and 45 and the pinch roller 13 are positioned spaced from the larger diameter drive pulley 8, fly-wheel 12 and capstan 7, respectively, so that all the idlers, fly-wheel and reels are free from the transmission of the drive means. The operation of the neutral mechanism makes the neutral position from any position of the changeover mechanism.

Figures 5, 8:
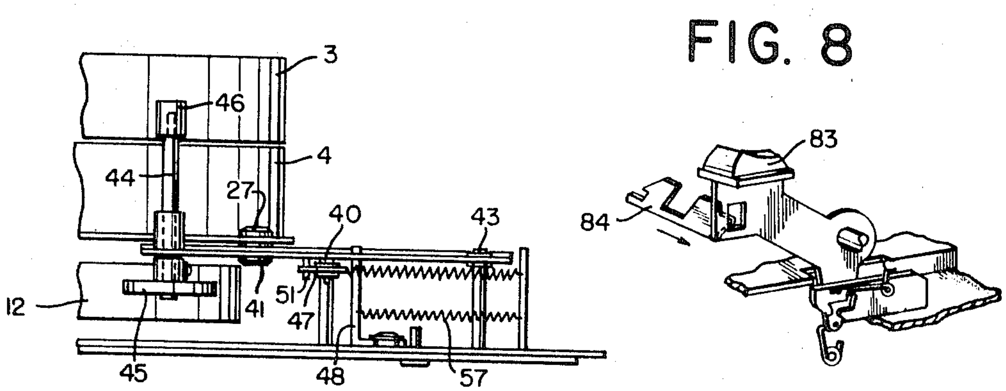
FIG. 5 is a side view showing a part of the mechanism of FIG. 1.
FIG. 8 is an isometric view showing a part of the mechanism of FIG. 1.

The changeover mechanism for slow motion reproduction includes, for instance, a push-push button 83, as shown in FIG. 8, engaged with a stop lever 84 of a push button (not shown) of the neutral mechanism. The slow-motion reproduction takes place by operation of the push-push button 83 to move the slide plate 56 to its second (up) position; the still motion reproduction takes place by operation of the rotary knob 46 in the slow-motion reproduction; and the neutral position takes place by operation of the stop lever 84 of push button 83 after the push button 83 is moved to put the slide plate 56 in its second position for normal speed reproduction.

Accordingly, the video-tape recorder with still reproduction device of this invention has the tape held between the capstan and the pinch roller with suitable tension during still motion reproduction; the capstan or the pinch roller is detached from the transmission of the drive means; and the tape is able to be rotated finely by the independent rotating mechanism 46 for rotating the capstan 7 together with the tape. The path of the tape around the guide cylinder of the head is shifted to adjust the relative scanning angle between the head and the tape for compensating for the tracking error therebetween. Further still motion reproduction operation can be done only from the condition of the slow-motion reproduction operating in the slow speed so that the tape is easy to place in the right and accurate position on the head and is held under tension to reproduce an excellent still picture in a trouble-free manner.

I have shown and described one embodiment in accordance with the present invention. It is understood that the same is not limited thereto, is susceptible of numerous changes and modifications as known to a person skilled in the art and I, therefore, do not wish to be limited to the details shown and described herein, but intend to cover all such changes and modifications as are encompassed.

What is claimed is:

1. In a video tape recorder of the type having tape supply means, tape take up means, a guide means on which the tape travels, and main drive means, the improvement comprising apparatus for still motion reproduction during which the tape is held at rest on the guide means, said apparatus including while the tape is at rest, a capstan drive operable from said drive means and a pinch roller contacting the tape while at rest, means operating between the drive means and the take up means for keeping tension on the tape, means for detaching the capstan from the drive means, and means for finely adjusting the position of said tape on the guide means.

2. A video tape recorder as in claim 1 wherein the adjusting means comprises means for normally rotating the capstan.

3. A video tape recorder as in claim 1 wherein there is a first drive member (22) between said main drive means and said capstan and said detaching and adjusting means comprises first means for spacing said first drive member (22) from said capstan while simultaneously providing means for manually rotating said capstan.

4. A video tape recorder as in claim 3 wherein said first means comprises a link mechanism including a release lever (27) for moving said first drive means relative to said capstan, and a rotatable lever (40) operating said release lever and having thereon means (45) for engaging and rotating the capstan.

5. A video tape recorder as in claim 4 wherein said capstan is connected to a flywheel and said engaging and rotating means engages the flywheel.

6. A video tape recorder as in claim 1 further comprising means for shifting the path of the tape with respect to said guide means.

7. A video tape recorder as in claim 6 wherein said shifting means is located adjacent the surface of said guide means.

8. Apparatus as in claim 6 wherein said tape shifting means comprises a movable guide further comprising a first drive means operable between said main drive means and said capstan, first means for operating said first drive means to engage said capstan to drive it to transport the tape at a first speed, means connecting said first means to said movable guide, said connecting means being operated by said first means when moved to a position to disengage the first drive means from the capstan operating to move the tape guide means and the tape.

9. In a video tape recorder of the type having tape supply means, tape take up means, a guide means on which the tape travels, a capstan for transporting the tape, main drive means, first drive means operating from said main drive means for driving the capstan and the tape at a first speed, second drive means operating from said main drive means for driving the capstan and the tape at a second speed which is less than said first speed, the improvement comprising:

means for disengaging both said first and second drive means from said capstan to bring the tape to rest on the guide means, and means for maintaining tension on the tape between the capstan and the take up means while the tape is at rest.

10. A video tape recorder as in claim 9 wherein said tension maintaining means comprises third means engaging said main drive means and said take up means.

11. A video tape recorder as in claim 9 further comprising means for adjusting the position of the tape on the guide means when the tape is at rest by manually rotating the capstan.

12. In a video tape recorder of the type having tape supply means, tape take up means, a guide means on which the tape travels, a capstan for transporting the tape, main drive means, first drive means operating from said main drive means for driving the capstan and the tape at a first speed, second drive means operating from said main drive means for driving the capstan and the tape at a second speed which is less than said first speed, the improvement comprising:

means for disengaging both said first and second drive means from said capstan to bring the tape to rest on the guide means, and means operable when said first drive means is disengaged from the capstan and the tape is being moved at said second speed and when both said first and second drive means are disengaged from the capstan and the tape is at rest for shifting the path of the tape with respect to the guide means that the tape takes when being moved at said first speed.

13. A video tape recorder as in claim 12 wherein said tape shifting means comprises a lever, a connecting rod moved by said lever, and a variable height device engaging said tape and operated by the movement of the lever.

References Cited

UNITED STATES PATENTS

| | | | |
|---|---|---|---|
| 3,123,268 | 3/1964 | Gagg | 226—111 |
| 3,458,154 | 7/1969 | Kleist | 242—182 |

LEONARD D. CHRISTIAN, Primary Examiner

U.S. Cl. X.R.

226—37, 181